United States Patent
Byers

(10) Patent No.: US 9,426,538 B2
(45) Date of Patent: Aug. 23, 2016

(54) METHOD AND APPARATUS FOR PRESENTING ADVERTISING IN CONTENT HAVING AN EMOTIONAL CONTEXT

(71) Applicant: AT&T Intellectual Property I, LP, Atlanta, GA (US)

(72) Inventor: Simon D. Byers, Summit, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 52 days.

(21) Appl. No.: 14/085,537

(22) Filed: Nov. 20, 2013

(65) Prior Publication Data

US 2015/0143404 A1    May 21, 2015

(51) Int. Cl.
| | |
|---|---|
| *H04N 7/10* | (2006.01) |
| *G06Q 30/00* | (2012.01) |
| *H04N 21/81* | (2011.01) |
| *H04N 21/435* | (2011.01) |
| *H04N 21/25* | (2011.01) |
| *G06Q 30/02* | (2012.01) |
| *H04N 21/466* | (2011.01) |
| *H04N 21/234* | (2011.01) |
| *H04H 60/32* | (2008.01) |
| *H04N 7/025* | (2006.01) |

(52) U.S. Cl.
CPC ......... *H04N 21/812* (2013.01); *G06Q 30/0207* (2013.01); *G06Q 30/0242* (2013.01); *G06Q 30/0244* (2013.01); *G06Q 30/0251* (2013.01); *G06Q 30/0271* (2013.01); *H04N 21/23424* (2013.01); *H04N 21/251* (2013.01); *H04N 21/435* (2013.01); *H04N 21/4668* (2013.01)

(58) Field of Classification Search
CPC ............ H04N 21/4668; H04N 21/812; H04N 21/251; H04N 21/466; H04N 21/23424; H04N 21/435; G06Q 30/0251; G06Q 30/0242; G06Q 30/0271; G06Q 30/0207; G06Q 30/0244
USPC .............. 725/32, 36, 14, 19; 705/14.4, 14.43, 705/14.49, 14.67
See application file for complete search history.

(56) References Cited

U.S. PATENT DOCUMENTS

| | | |
|---|---|---|
| 5,676,138 A | 10/1997 | Zawilinski |
| 5,758,257 A | 5/1998 | Herz |
| 6,292,688 B1 | 9/2001 | Patton |
| 6,322,368 B1 | 11/2001 | Young et al. |
| 6,585,521 B1 | 7/2003 | Obrador |
| 7,151,540 B2 | 12/2006 | Young |

(Continued)

OTHER PUBLICATIONS

Achanta, et al., "Modeling intent for home video repurposing", Multimedia, IEEE 13.1 (2006): 46-55. http://csce.uark.edu/~jgauch/library/Video/Achanta.2006.pdf.

(Continued)

*Primary Examiner* — Hoang-Vu A Nguyen-Ba
(74) *Attorney, Agent, or Firm* — Jay Anderson; Guntin & Gust, PLC

(57) ABSTRACT

Aspects of the subject disclosure may include, for example, receiving a media program on a first media channel, detecting a first segment in the media program, where the first segment comprises media content combined with an embedded advertisement, determining a first emotional context from a first analysis of the media content, determining a second emotional context from a second analysis of the embedded advertisement, and detecting an inconsistency between the first emotional context and the second emotional context. Other embodiments are disclosed.

20 Claims, 7 Drawing Sheets

(56) References Cited

U.S. PATENT DOCUMENTS

| | | | |
|---|---|---|---|
| 7,169,113 B1 | 1/2007 | Young | |
| 7,246,081 B2 | 7/2007 | Hill | |
| 7,889,073 B2 | 2/2011 | Zalewski | |
| 8,090,613 B2 | 1/2012 | Kalb et al. | |
| 8,136,944 B2 | 3/2012 | De Lemos | |
| 8,230,457 B2 | 7/2012 | Lee et al. | |
| 8,326,630 B2 | 12/2012 | Chandrasekar et al. | |
| 8,347,326 B2 | 1/2013 | Weitzenfeld et al. | |
| 8,363,716 B2 * | 1/2013 | Kalva | H04N 21/23412 375/240.01 |
| 8,386,312 B2 | 2/2013 | Pradeep et al. | |
| 8,401,248 B1 | 3/2013 | Moon et al. | |
| 8,442,849 B2 | 5/2013 | Kantak et al. | |
| 2007/0250901 A1 * | 10/2007 | McIntire | H04N 7/17318 725/146 |
| 2008/0068397 A1 | 3/2008 | Carey et al. | |
| 2010/0107075 A1 | 4/2010 | Hawthorne et al. | |
| 2010/0153210 A1 * | 6/2010 | Oh | G06Q 30/02 705/14.52 |
| 2011/0223571 A1 | 9/2011 | Farahat et al. | |
| 2011/0225043 A1 | 9/2011 | Bhatia et al. | |
| 2011/0225049 A1 | 9/2011 | Bhatia et al. | |
| 2012/0047447 A1 | 2/2012 | Haq | |
| 2013/0080260 A1 * | 3/2013 | French et al. | 705/14.66 |
| 2013/0205314 A1 * | 8/2013 | Ramaswamy et al. | 725/14 |
| 2013/0227616 A1 * | 8/2013 | Kalva | H04N 21/23412 725/61 |
| 2014/0002644 A1 * | 1/2014 | Fedorovskaya et al. | 348/143 |
| 2014/0108309 A1 * | 4/2014 | Frank et al. | 706/12 |
| 2015/0033266 A1 * | 1/2015 | Klappert et al. | 725/52 |

OTHER PUBLICATIONS

Oliveira, et al., "Ifelt: accessing movies through our emotions", Proceddings of the 9th international interactive conference on Interactive television. ACM, 2011. http://www.academia.edu/69469/iFelt_Accessing_Movies_Through_Our_Emotions.

Yoo, et al., "Video scene retrieval with interactive genetic algorithm", Multimedia Tools and Applications 34.3 (2007): 317-336. http://sclab.yonsei.ac.kr/publications/Papers/IJ/SBCho_MMTA2007.pdf.

* cited by examiner

100

200

METHOD AND APPARATUS FOR PRESENTING ADVERTISING IN CONTENT HAVING AN EMOTIONAL CONTEXT

FIELD OF THE DISCLOSURE

The subject disclosure relates to a method and apparatus for presenting promotional content.

BACKGROUND

The success of promotional content, such as television advertisements, depends in part on the ability to target a proper audience. The choice of which advertisements are shown in a particular time slot is generally driven by sponsors who purchase the right to air promotions.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for selecting promotional material based on the emotional context of program scenes. Other embodiments are described in the subject disclosure.

One embodiment of the subject disclosure includes a device having a processor, and a memory that stores executable instructions that, when executed by the processor, facilitate performance of operations, including receiving a media program from a source, determining a first emotional context from a first analysis of a first segment of the media program, obtaining an advertisement that correlates to the first emotional context of the first segment, and presenting the advertisement in an advertisement slot of the media program occurring after the first segment.

One embodiment of the subject disclosure includes a machine-readable storage medium, having executable instructions that, when executed by a processor, facilitate performance of operations, including receiving a media program on a first media channel, detecting a first segment in the media program, where the first segment comprises media content combined with an embedded advertisement, determining a first emotional context from a first analysis of the media content, determining a second emotional context from a second analysis of the embedded advertisement, and detecting an inconsistency between the first emotional context and the second emotional context.

One embodiment of the subject disclosure includes a method for receiving, by a system comprising a processor, a media program, identifying, by the system, a segment in the media program, performing, by the system, emotional context analysis on the segment to determine an event state of subject matter presented in the segment, and obtaining, by the system, an advertisement that correlates to the event state.

Figure 1:
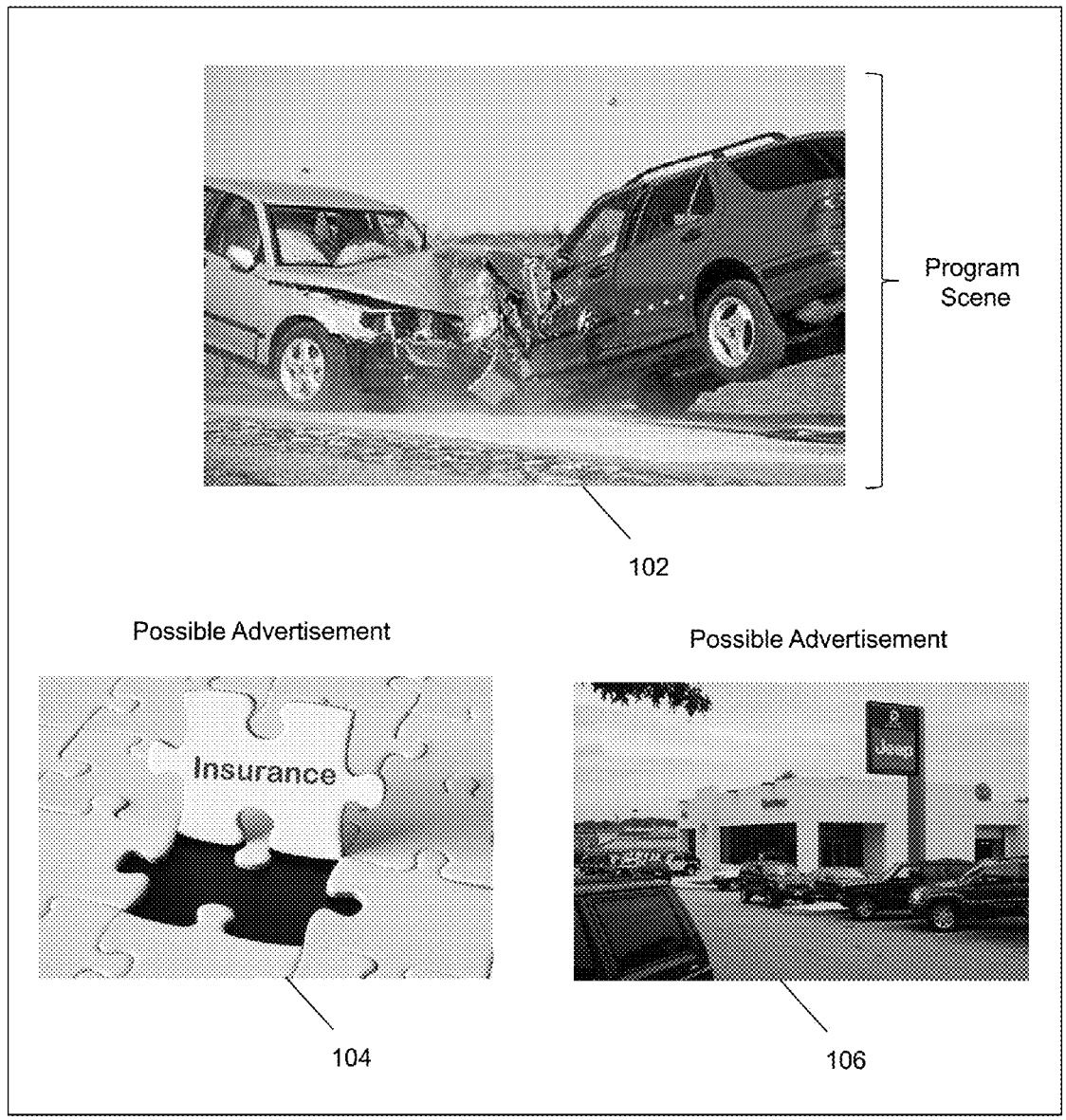
FIG. 1 depicts an illustrative embodiment of a program scene and possible presentations of promotional material.
Figure 4:
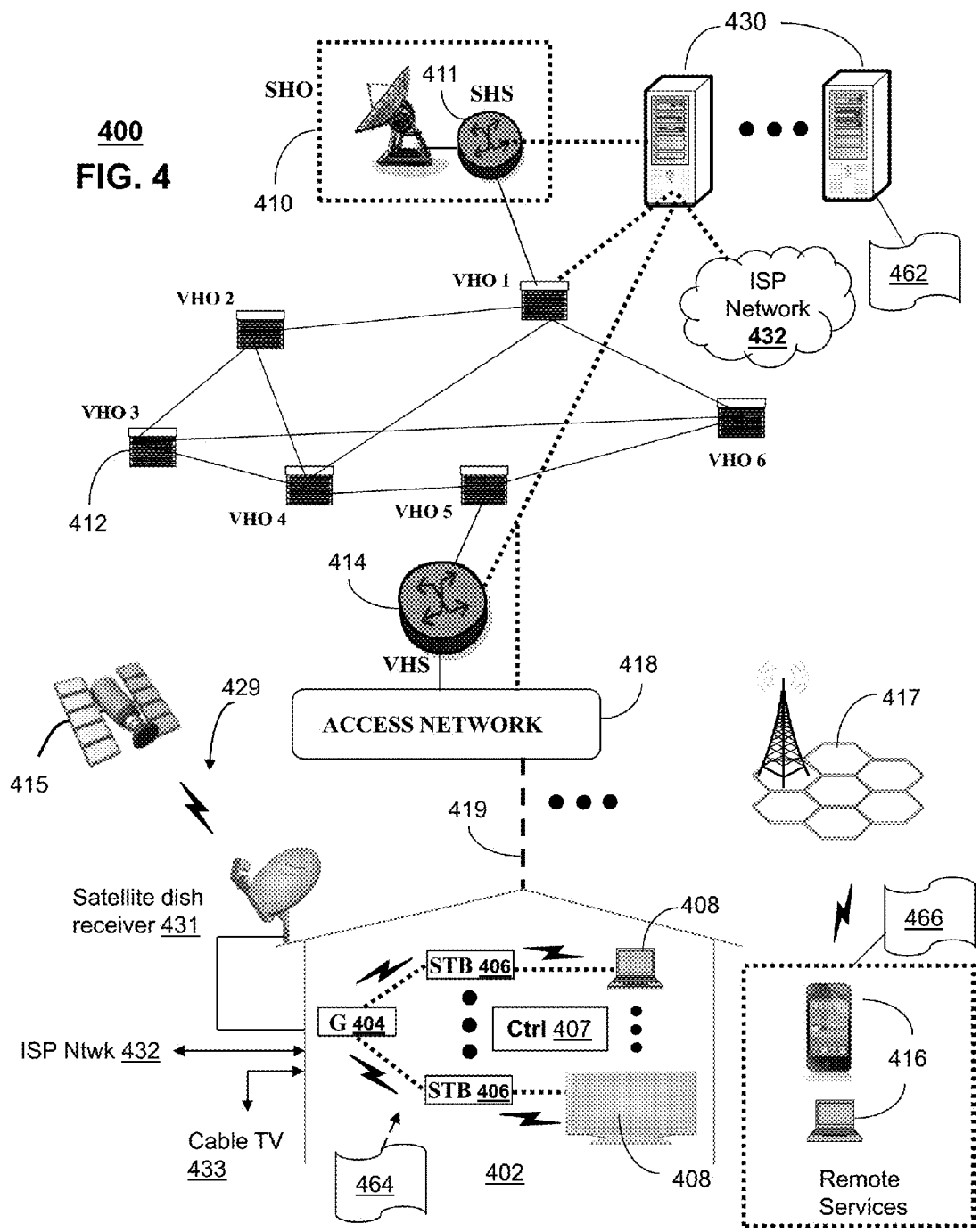
FIGS. 4-5 depict illustrative embodiments of communication systems that provide media services such as shown in FIGS. 1-2.

FIG. 1 depicts an illustrative embodiment of a program scene 102 and optional promotional materials 104, 106 that can be presented subsequent to the program scene 102. The program scene 102 can be presented by a media processor 406 such as shown in FIG. 4. The media processor 406 can be a set-top box coupled to a television, or some other suitable media presentation device such as a computer, tablet or smart phone. In the illustration of FIG. 1, the program scene 102 represents a dramatic head-on car collision. A service provider of media content containing program scene 102 can present a first advertisement 104 which promotes car insurance, or a second advertisement 106 which promotes car sales.

A sponsor of the first advertisement 104 would likely find it desirable to present the first advertisement 104 after the car crash since viewing such a dramatic crash may lead the viewer to think of the dangers of driving, injuries that can be caused to multiple parties in an accident, and loss of value in significant car accidents. Viewing a car insurance commercial after a car crash can therefore correlate to a viewer's emotional state and perhaps desire to mitigate dangerous events such as the dramatic footage depicted in the program scene 102. A viewer's emotional state after reviewing a car accident would likely not incite thoughts in the viewer to purchase a car. Thus, presenting the second advertisement 106 which promotes car sales is unlikely to correlate with the emotional state of the viewer after viewing scene 102. Accordingly, a sponsor of the second advertisement 106 would likely not find it desirable to present the second advertisement 106 after the crash scene 102 given that the viewer's emotional state may be focused on danger and injury, which would not be conducive to a desire for a new or used car.

Figure 2:
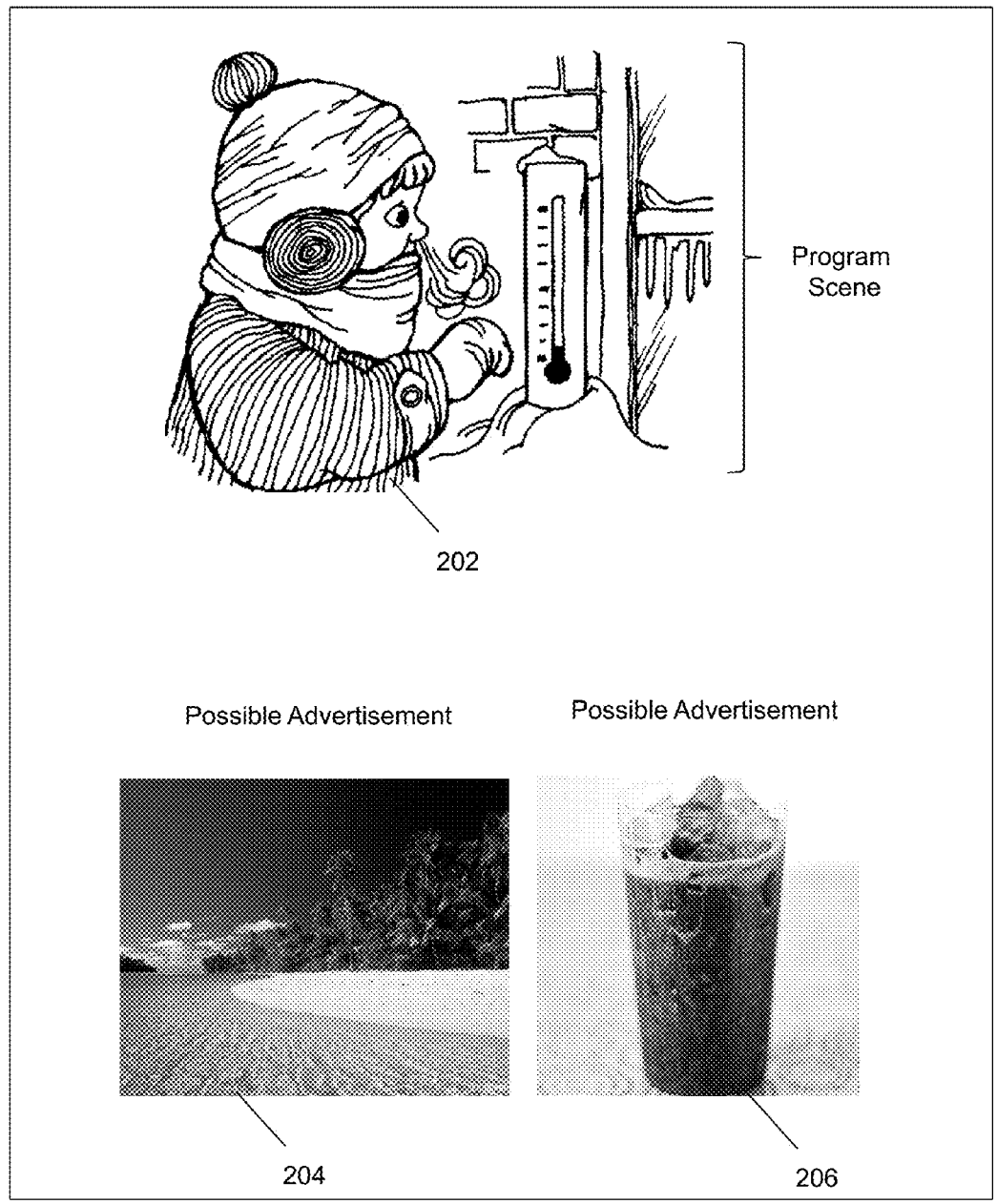
FIG. 2 depicts an illustrative embodiment of a program scene and possible presentations of promotional material.

FIG. 2 depicts an illustrative embodiment of another program scene 202 and optional promotional materials 204, 206 that can be presented subsequent to the program scene 202. The program scene 202 can also be presented by the media processor 406 of FIG. 4. In the illustration of FIG. 2, the program scene 202 represents an animation scene depicting a child viewing a thermometer during what appears to be very cold weather noticeable by the puff of smoke from the child's breath. A service provider of media content containing program scene 202 can present a first advertisement 204 for promoting a warm beach vacation, or a second advertisement 106 for promoting an ice cold soft drink.

A sponsor of the first advertisement 204 would find it desirable to present the first advertisement 204 after scene 202 since viewing cold weather conditions may lead the viewer to bring to mind the need to stay warm, especially if the viewer lives in a cold climate. Viewing a beach vacation commercial after a cold weather scene can therefore correlate to a viewer's emotional state and perhaps desire to be in a warmer climate in contrast to the footage depicted in scene 202. A viewer's emotional state after reviewing a cold climate would likely not give rise to thoughts of anything that may worsen the viewer's desire to stay warm. Thus, presenting the second advertisement 206 which promotes an ice cold soft drink is unlikely to correlate with the emotional state of the viewer after viewing scene 202. Accordingly, a sponsor of the second advertisement 206 would likely not find it desirable to present the second advertisement 206 after a cold climate scene 202.

Figure 3:
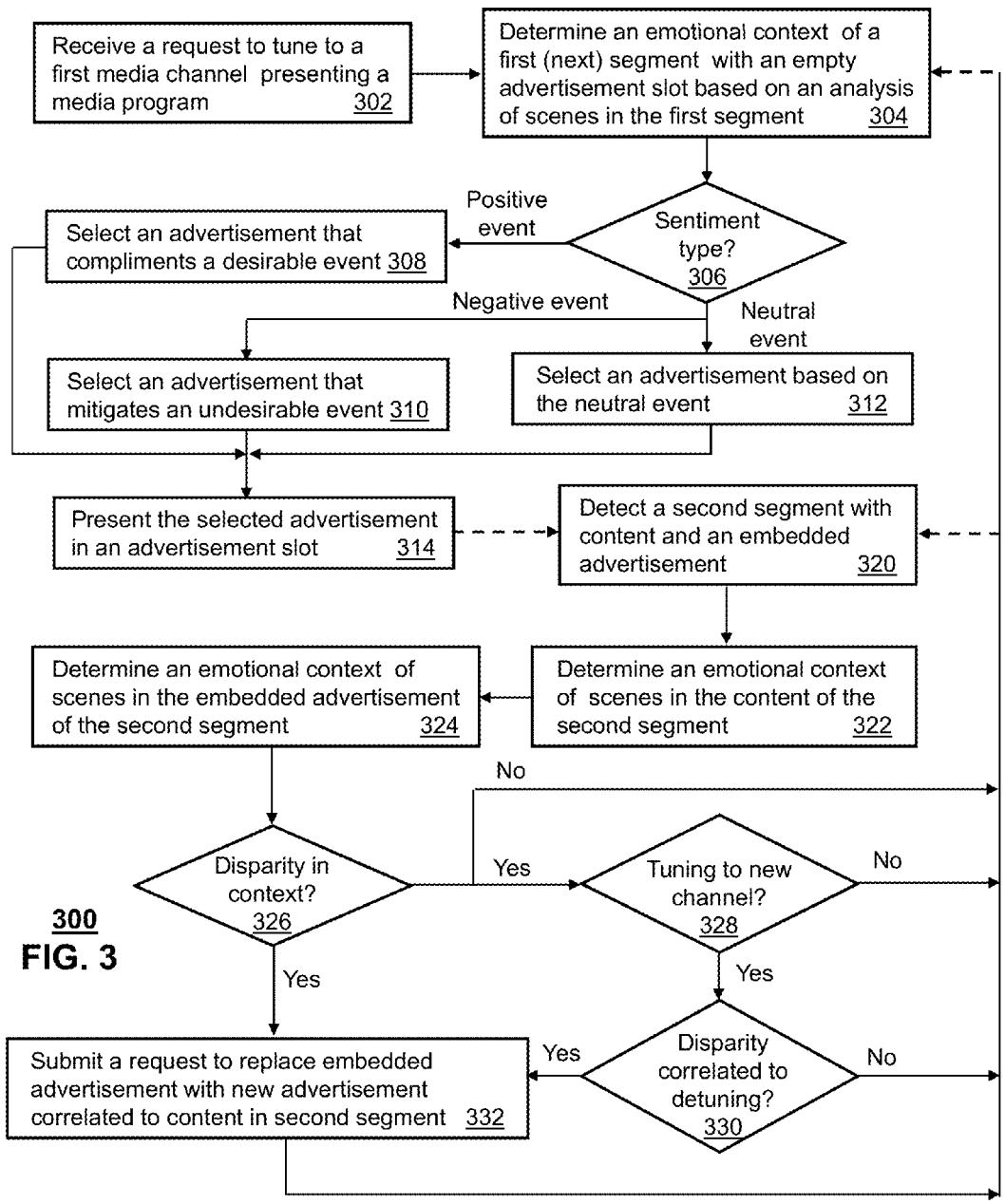
FIG. 3 depicts an illustrative embodiment of a method used in portions of the communication systems shown in FIGS. 4-5.

When sponsors purchase advertisements slots irrespective to the subject matter being presented, the viewer's emotional state may not be correlated to the advertisement being presented as has been shown by the illustrations of FIGS. 1-2. FIG. 3 depicts an illustrative embodiment of a method 300 that can be used by devices of the communication systems 400-500 shown in FIGS. 4-5 to present promotional materials that are correlated to the subject matter of previously viewed media content. Method 300 can begin with a media processor 406 receiving at step 302 a request to turn to a channel that is broadcasting a media program that may be of interest to a user who initiates the request using the remote controller 407 of FIG. 4 or another device such as a smart phone or tablet.

Figure 5:
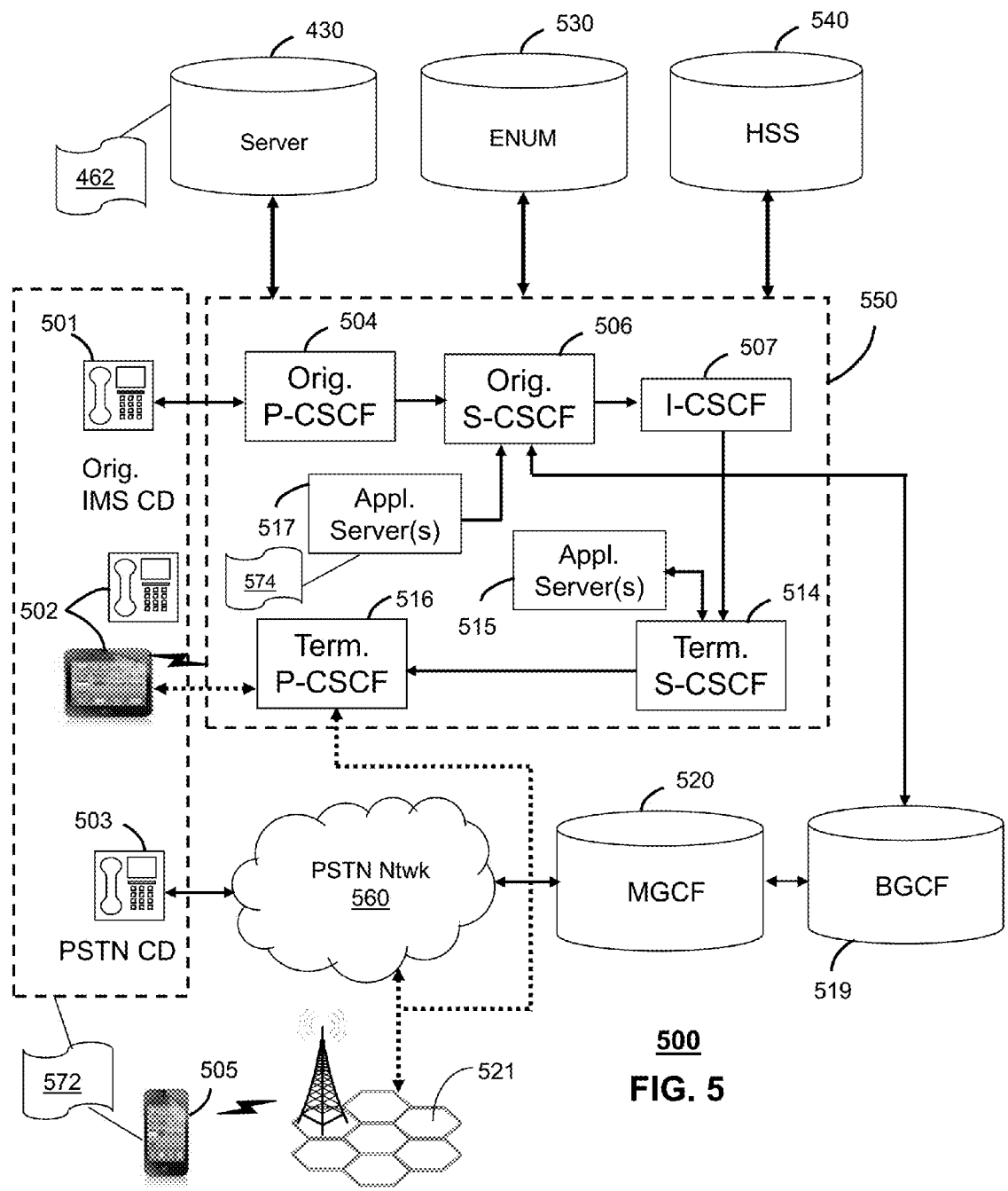

A server 430 shown in FIGS. 4-5 can be configured to determine at step 304 an emotional context of a first segment of the media program. The first segment can be of any duration and can include regular programming content (e.g., movie, TV show, etc.), which is then followed by an available empty advertisement slot which can be populated by the server 430 with an advertisement selectable from a database of advertisements accessible to the server 430. The emotional context can be determined by performing image processing on the programming content using multimodal sentiment analysis which can detect images that may be considered to viewers as positive content (e.g., a romantic scene, a mountainous landscape with clear blue skies, characters smiling or laughing and getting along, etc.). Multimodal sentiment analysis can also detect negative sentiment (e.g., fighting scenes, violence, characters showing signs of anger, frustration, sadness, depression, scenes of destruction, war, etc.). Multimodal sentiment analysis can further detect neutral or near neutral sentiment in situations where there may be counterpoising positive and negative sentiment, stoic expressions from characters, or other circumstances which may not sway or influence a viewer's sentiment in any particular direction.

In addition to predicting a sentimental bias of the viewer based on the images of the segment being analyzed, the server 430 can also analyze the scene(s) and generate metadata that is descriptive of the context of scenes in the segment, or retrieve from the segment (if available) metadata descriptive of the scene(s). The server 430 can use this information to search for advertisements by correlating the context sensitive metadata descriptions and the predicted sentimental bias of the viewer with metadata and sentimental bias information supplied with advertisement items stored in a database.

Suppose in one embodiment that the sentiment detected at step 306 is positive. In this instance, the server 430 can select an advertisement from a local or remote database of advertisements or other sources of promotional materials that compliments a desirable event detected in the segment. For example, suppose that the event detected is a romantic scene. Such a scene can be complimented with, for example, an advertisement relating to the purchase of an engagement ring. An advertisement that compliments the desirable event can be selected by the server 430 by determining which of a plurality of advertisements has a strong correlation between metadata descriptive of the detected event in the segment and the predicted sentimental bias of the viewer upon viewing the segment, and descriptive and sentimental bias supplied with each selectable advertisement in the database.

For example, a romantic scene may show two characters of the media program engaged in a passionate kiss. The server 430 may associate such images with a possible feeling of love or strong affection between the characters shown in the images, and generate metadata descriptive of those images, or retrieve such metadata from the segment if available. A frequent occurrence of such scenes by the same characters may further raise a confidence determination by the server 430 that the scene involves what a viewer may perceive as love or a strong affection, which in turn can raise a sentiment of romance by the viewer, which can be interpreted as a positive sentimental bias. Upon detecting a positive sentimental bias associated with romance, the server 430 can search for advertisements that correlate with a positive sentiment and which correlate with romance involving or inferring commitment between couples. With correlation criteria such as this, the server 430 may, for example, select advertisements relating to couples vacation spots, advertisements relating to jewelry, advertisements relating to gift purchases for a significant other, and so on.

Suppose instead that the server 430 detects at step 306 a negative event such as the car crash scene 102 in FIG. 1, or a cold animation scene 202 of FIG. 2, each depicting negative circumstances, e.g., scene 102 creating negative sentiment caused by a sense of danger, injury, perhaps loss of life, and scene 202 creating a negative sentiment by a viewer towards cold climates. The server can generate or retrieve metadata from the scenes which describe the scenes (violent crash and cold climate), and predict based on multimodal sentiment analysis a negative sentimental bias by viewers. For either scene 102 or 202, the server 430 can search for advertisements that can mitigate the detected event by correlating the descriptive metadata to descriptions of the advertisements that mitigate the event, and further correlate to advertisements that mitigate a viewer's negative sentiment.

For example, in the case of scene 102, the server 430 can search for advertisements that can mitigate injury, loss of life, loss of property, and so on. One mitigating form of advertisement would be insurance coverage. Another mitigating form advertisement may be a commercial relating to new cars with innovative warning systems that can warn drivers against head-on collisions. For scene 202, the server 430 can search for advertisements that mitigate cold weather conditions such as tropical vacations, a new home heating system, insulated windows, and so on. The server 430 can correlate descriptive metadata and the predicted sentimental bias of scenes 102 and 202 to descriptive metadata and sentimental bias descriptions of the advertisements to arrive at the search results described above.

Suppose instead that the server 430 detects at step 306 a neutral event. A neutral event as described earlier can be based on, for example, images in the segment that produce counterpoising positive and negative sentiment in a viewer, or images in the segment that show stoic expressions in the characters, or background images in the segment that may not produce a sentimental bias viewers. For example, suppose the images the viewer is seeing involve a car chase where one of the characters fleeing is consider a good person, while those chasing are considered bad. Further assume the server 430 can determine from metadata provided with the media program (or segment) which characters are considered good versus bad. The metadata can for example identify good characters by the names of the actors and/or provide images of them. If only the names of the actors are given, the server 430 can search a database of images of the actors to detect the actors in the segment being analyzed. Now suppose that the good character gets away, while the bad characters crash and are unable to continue the chase.

From these circumstances, the multimodal sentiment analysis software used by the server 430 can predict positive and negative sentiments by the viewer based on several events detected in the segment. Positive sentiment may be determined from the good character getting away, and negative sentiment may be based on the car crash, and subsequent injuries that may have occurred. Balancing the effects of positive and negative sentiments, the server 430 may determine that the sentiment is considerably neutral. With a neutral sentiment, the server 430 can in step 312 broaden the scope of the search for advertisements given that the viewer may not have a sentimental bias at the time of viewing the segment. Now suppose in the foregoing illustration that the good character used a popular sports car during the chase. The multimodal sentiment analysis tool used by the server 430 may tip the sentiment scale towards a neutral-positive sentiment. In this instance, the server 430 can further search in the advertisement database at step 312 for advertisements relating to car sales of sports cars, which the server 430 may determine may be of interest to the viewer upon detecting in scenes of the segment an emphasis of the sports car used by the good character.

Once an advertisement is chosen at steps 308, 310 or 312, the server 430 proceeds to step 314 to facilitate the insertion of the selected advertisement in the empty advertisement slot identified at step 304. The server 430 can direct one or more network nodes of communication systems 400-500 shown in FIGS. 4-5 such as a video head-end Office (VHO), a video head-end server (VHS), or application server(s) to insert the selected advertisement in a broadcast media stream sent to media presentation equipment of viewers. Alternatively, the server 430 can perform the insertion of the selected advertisement by intercepting the media stream and updating the media stream with the selected advertisement while in transit. Once inserted, the viewers of the broadcast media program supplied by the first channel described in step 302 will see the selected advertisement which based on the analysis of steps 304 and 306 would be correlated to a sentimental bias of the segment being presented.

As a concurrent or independent process, the server 430 can be further configured to detect at step 320 segments of the media program that combine program content with an embedded advertisement (i.e., instances where an advertisement slot has been pre-populated). At step 322, the server 430 can be configured to determine by way of the multimodal sentiment analysis an emotional context of one or more scenes in the content portion of the segment much the way it was described above (e.g., positive, negative or neutral sentiment predictions). In this step, the server 430 can also determine the context of the scenes (e.g., car crash, romance, etc.) from image processing analyzes described earlier or from embedded metadata provided in the segment. At step 324, the server 430 can use multimodal sentiment analysis on the images of embedded advertisement to determine an emotional context of one or more scenes in the embedded advertisement, along with a determination of the context of the scenes (e.g., car sale promotion, jewelry promotion, etc.).

The server 430 can then compare the emotional context and descriptive metadata of the content determined at step 322 to the emotional context and descriptive metadata of the embedded advertisement determined at step 324 to determine if a disparity exists between the sentimental biases and/or context descriptions of the content and embedded advertisement, respectively. For example, if the emotional context of the content is negative, and the context relates to an injury (e.g., car crash of scene 102), then for correlation to exist the embedded advertisement would need to mitigate the scene (e.g., insurance promotion 104) else it may not be considered as desirable to its viewers. If a disparity does not exist, the server 430 can proceed to step 304 to analyze a next segment of the media content having an empty advertisement slot, or can proceed to step 320 if the next segment has an embedded advertisement.

If at step 326 a disparity is detected, the server 430 can proceed to step 332 and submit a request to replace the embedded advertisement with a new advertisement that correlates to the content in the segment detected at step 320. Alternatively, the server 430 can proceed to step 328 where it monitors when subscribers switch channels at the time the embedded advertisement occurs. At step 330 the server 430 can determine if the disparity in emotional context of the content and the emotional context of the embedded advertisement had an effect on the viewer switching channels. The server 430 can perform this analysis by measuring a first number of viewers that switch channels when advertisements are not emotionally correlated to previously viewed content and measuring a second number of viewers that switch channels when advertisements are emotionally correlated to the content. If the first number of viewers exceeds the second number of viewers, then the server 430 can assess that the detuning from the first channel to the second channel is likely the result of the disparity in emotional context detected at step 326.

Upon detecting the that first number exceeds the second, a conclusion can be reached that when a media content presentation is emotionally correlated to a subsequent presentation of advertisement the likelihood of a detuning event decreases for the viewing population. If decorrelation between the content and the embedded advertisement is determined by the server 430 to be high and consistent for the population of viewers, the server 430 can proceed to step 332 and submit a request for a replacement of the embedded advertisement with advertisement that is emotionally correlated to the content. Step 332 can be useful when a media program is aired more than once at different timeslots across different geographic regions, cities and/or time zones. From step 332, the server 430 can proceed to step 304 or step 320 depending on whether advertisement slot of the next segment is populated or empty.

Although method 300 has been described from the perspective of server 430, the steps of method 300 can be performed by other devices such as the media processor 406 of FIG. 4 (e.g., a set-top box, a computer, a smart phone, a tablet, or any device with media processing capabilities).

With this in mind, FIG. 4 is now described in greater detail. The communication system 400 of FIG. 4 can represent an Internet Protocol Television (IPTV) media system. Devices depicted in communication system 400 can be configured as described earlier to perform the operations described by method 300.

For example, portions of communication system 400 can be configured to perform operations including but not limited to receiving a media program on a first media channel, detecting a first segment in the media program, where the first segment comprises media content combined with an embedded advertisement, determining a first emotional context from a first analysis of the media content, determining a second emotional context from a second analysis of the embedded advertisement, and detecting an inconsistency between the first emotional context and the second emotional context.

Portions of communication system 400 can also be configured to perform operations including but not limited to receiving a media program from a source (such as a VHO or VHS), determining a first emotional context from a first analysis of a first segment of the media program, obtaining an advertisement that correlates to the first emotional context of the first segment, and presenting the advertisement in an advertisement slot of the media program occurring after the first segment.

To perform these features, the IPTV media system can include a super head-end office (SHO) 410 with at least one super head-end office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) can can operate over a wireless access protocol such as Wireless Fidelity (WiFi) or can operate according to the Bluetooth® standard or the ZigBee® standard or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a server (herein referred to as server 430). The server 430 can use computing and communication technology to perform function 462, which can include among other things, the functions previously described by method 300. The media processors 406 and wireless communication devices 416 can be provisioned with software functions 464 and 466, respectively, to utilize the services of server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with communication system 400 as another representative embodiment of communication system 400. Devices depicted in communication system 500 can be configured as described earlier to perform the operations described by method 300.

For example, portions of communication system 500 can be configured to perform operations including but not limited to receiving a media program on a first media channel, detecting a first segment in the media program, where the first segment comprises media content combined with an embedded advertisement, determining a first emotional context from a first analysis of the media content, determining a second emotional context from a second analysis of the embedded advertisement, and detecting an inconsistency between the first emotional context and the second emotional context.

Portions of communication system 500 can also be configured to perform operations including but not limited to receiving a media program from a source (an application server), determining a first emotional context from a first analysis of a first segment of the media program, obtaining an advertisement that correlates to the first emotional context of the first segment, and presenting the advertisement in an advertisement slot of the media program occurring after the first segment.

To perform these features, communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to the second communication system 500 for purposes similar to those described above. Server 430 can perform function 462 and thereby provide emotionally correlated media and promotional content to the CDs 501, 502, 503 and 505 of FIG. 5. CDs 501, 502, 503 and 505, which can be adapted with software to perform function 572 to utilize the services of the server 430. Server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
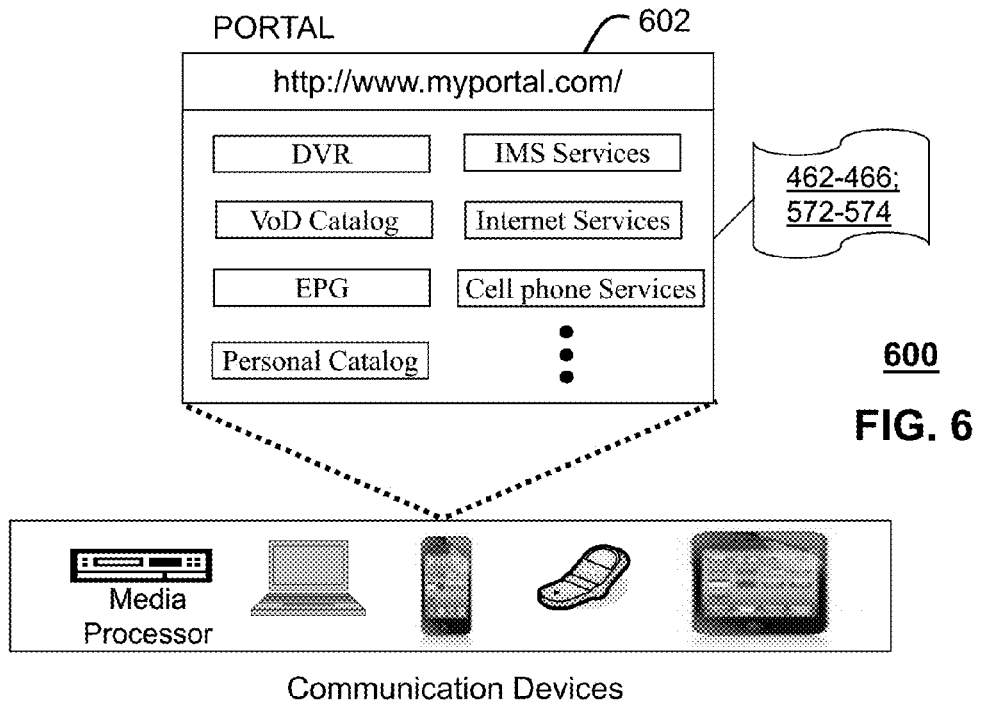
FIG. 6 depicts an illustrative embodiment of a web portal for interacting with the communication systems of FIGS. 4-5.

FIG. 6 depicts an illustrative embodiment of a web portal 602 which can be hosted by server applications operating from the computing devices 430 of the communication system 100 illustrated in FIG. 1. Communication system 600 can be overlaid or operably coupled with communication system 400, and/or communication system 500. The web portal 602 can be used for managing services of communication systems 400-500. A web page of the web portal 602 can be accessed by a Uniform Resource Locator (URL) with an Internet browser using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of communication systems 400-500.

Figure 7:
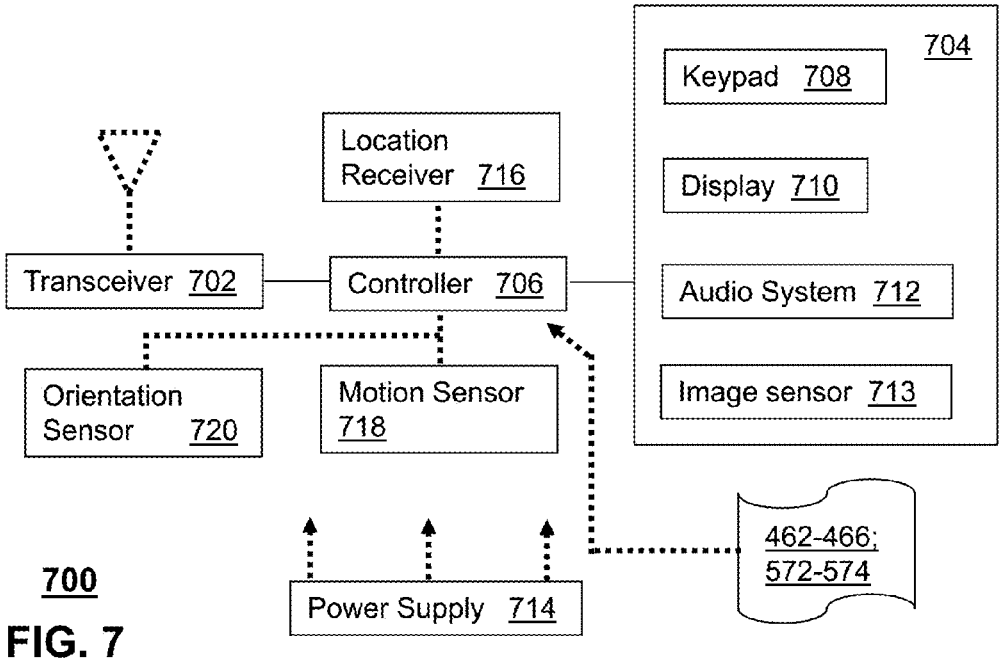
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 4-5. Communication device 700 can be configured to perform in whole or in part the steps described by method 300.

To enable these features, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as WiFi or DECT, technologies utilizing the Bluetooth® standard or the ZigBee® standard, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular or WiFi access point, an access point utilizing the Bluetooth® standard Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of communication system 400, and communication system 500. In addition, the controller 706 can be adapted in various embodiments to perform the functions 462-466 and 572-574, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
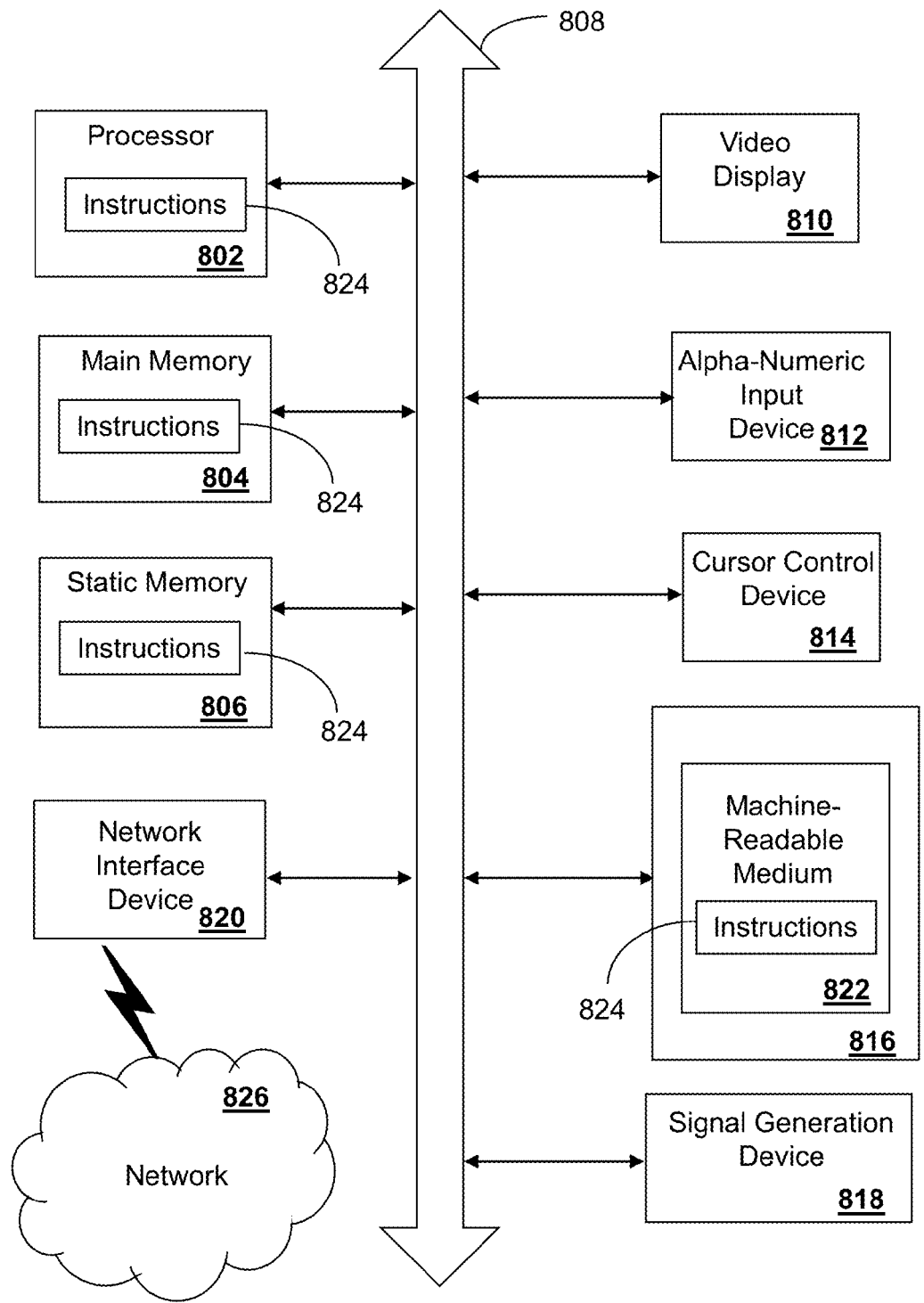
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 430, the media processor 406 and other devices of FIGS. 4-5. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., WiFi, the Bluetooth® standard or the ZigBee® standard), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
at least one processor; and
at least one memory that stores executable instructions that, when executed by the at least one processor, facilitate performance of operations, comprising:
receiving a media program having advertisement slots for presenting advertisements with the media program;
determining a first emotional context from a first analysis of a first segment of the media program to predict an emotional bias associated with viewing the first segment, the first analysis comprising image processing of programming content in the first segment;
obtaining an advertisement having a correlation to the first emotional context of the first segment determined from the first analysis; and
presenting the advertisement in one of the advertisement slots of the media program occurring after the first segment,
wherein responsive to the first emotional context comprising a negative event, the correlation of the advertisement is in accordance with the advertisement mitigating the negative event.

2. The device of claim 1, wherein the operations further comprise determining whether the first emotional context of the first segment comprises a desirable event.

3. The device of claim 2, wherein obtaining the advertisement comprises obtaining the advertisement from a database of advertisements based on the advertisement correlating to the desirable event.

4. The device of claim 3, wherein the correlation is determined from a presentation of the advertisement being complimentary to an event associated with a presentation of the desirable event.

5. The device of claim 1, wherein receiving the media program further comprises receiving descriptive metadata for the first segment.

6. The device of claim 5, wherein the correlation is determined by correlating the metadata to a description of the advertisement.

7. The device of claim 1, wherein obtaining the advertisement further comprises obtaining the advertisement from a database of advertisements based on the correlation of the advertisement.

8. The device of claim 1, wherein the media program is received in a first media channel, and wherein the operations further comprise:
detecting a second segment in the media program, wherein the second segment comprises media content combined with an embedded advertisement;
determining a second emotional context from a second analysis of the media content;
determining a third emotional context from a third analysis of the embedded advertisement; and
detecting a disparity between the second emotional context and the third emotional context.

9. The device of claim 8, wherein the operations further comprise:
- detecting a request to tune to a different media channel while the embedded advertisement is being presented; and
- detecting a correlation between the request to tune to the different media channel and the disparity between the second emotional context and the third emotional context.

10. The device of claim 9, wherein the operations further comprise submitting a request to replace the embedded advertisement with another advertisement that is correlated with the second emotional context of the media content of the second segment.

11. A non-transitory machine-readable storage device, comprising executable instructions that, when executed by a processor, facilitate performance of operations, comprising:
- receiving a media program on a first media channel;
- detecting a first segment in the media program, wherein the first segment comprises media content combined with an embedded advertisement;
- determining a first emotional context from a first analysis of the media content to predict a first emotional bias associated with viewing the media content, the first analysis comprising image processing of the media content;
- determining a second emotional context from a second analysis of the embedded advertisement to predict a second emotional bias associated with viewing the embedded advertisement; and
- detecting an inconsistency between the first emotional context and the second emotional context.

12. The non-transitory machine-readable storage device of claim 11, wherein the operations further comprise:
- detecting a request to tune to a different media channel while the embedded advertisement is being presented; and
- detecting a correlation between the request to tune to the different media channel and the inconsistency between the first emotional context and the second emotional context.

13. The non-transitory machine-readable storage device of claim 12, wherein the operations further comprise submitting a request to replace the embedded advertisement responsive to detecting the correlation between the request to tune to the different media channel and the inconsistency between the first emotional context and the second emotional context.

14. The non-transitory machine-readable storage device of claim 13, wherein the operations further comprise obtaining a replacement advertisement that is correlated to the first emotional context.

15. The non-transitory machine-readable storage device of claim 14, wherein the operations further comprise replacing the embedded advertisement with the replacement advertisement.

16. The non-transitory machine-readable storage device of claim 11, wherein the operations further comprise:
- detecting a second segment in the media program;
- determining a third emotional context from a third analysis of the second segment;
- obtaining an advertisement that correlates to the third emotional context of the second segment; and
- presenting the advertisement in an advertisement slot in the media program occurring after the second segment.

17. The non-transitory machine-readable storage device of claim 16, wherein the operations further comprise determining whether the third emotional context of the second segment comprises a desirable event or undesirable event, wherein obtaining the advertisement comprises obtaining the advertisement from a database of advertisements based on the advertisement correlating to the desirable event or the undesirable event.

18. A method, comprising:
- receiving, by a system comprising a processor, a media program;
- identifying, by the system, a segment in the media program;
- performing, by the system, emotional context analysis on the segment to determine an event state of subject matter presented in the segment and to predict an emotional bias associated with viewing the segment, the emotional context analysis comprising image processing of programming content in the segment; and
- obtaining, by the system, an advertisement having a correlation to the event state,
- wherein responsive to the event state comprising a negative event, the correlation of the advertisement is in accordance with the advertisement mitigating the negative event.

19. The method of claim 18, further comprising presenting, by the system, the advertisement in an advertisement slot in the media program occurring after the segment.

20. The method of claim 18, wherein obtaining the advertisement comprises obtaining the advertisement from a database of advertisements based on the correlation of the advertisement to the event state.

* * * * *